(12) United States Patent
Puester et al.

(10) Patent No.: US 8,053,111 B2
(45) Date of Patent: *Nov. 8, 2011

(54) METHOD FOR MANUFACTURING A BIPLATE ASSEMBLY, A BIPLATE ASSEMBLY AND A BIPOLAR BATTERY

(75) Inventors: Neil H. Puester, Aurora, CO (US); Lars Fredriksson, Täby (SE)

(73) Assignee: Nilar International AB, Täby (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/187,200

(22) Filed: Jul. 2, 2002

(65) Prior Publication Data

US 2003/0013016 A1 Jan. 16, 2003

(30) Foreign Application Priority Data

Jul. 16, 2001 (SE) .................................... 0102544

(51) Int. Cl.
*H01M 4/04* (2006.01)
*H01M 4/02* (2006.01)
*H01M 2/18* (2006.01)
*H01M 10/18* (2006.01)

(52) U.S. Cl. .................. 429/210; 429/218.1; 429/218.2; 429/223; 429/518; 429/527

(58) Field of Classification Search .................. 429/210, 429/233, 234, 245, 246, 208, 235, 236, 237, 429/241, 244, 218.2, 223, 218.1, 518, 527; 204/254, 268, 282
See application file for complete search history.

(56) References Cited

U.S. PATENT DOCUMENTS

| | | | |
|---|---|---|---|
| 4,551,399 A * | 11/1985 | Despic | 429/404 |
| 4,610,081 A * | 9/1986 | Triner | 29/623.1 |
| 4,781,995 A * | 11/1988 | Giner | 429/13 |
| 5,106,709 A * | 4/1992 | Tekkanat et al. | 429/210 |
| 5,200,281 A * | 4/1993 | Leap et al. | 429/129 |
| 5,344,723 A | 9/1994 | Boronel et al. | |
| 5,441,824 A * | 8/1995 | Rippel | 429/53 |
| 5,728,490 A * | 3/1998 | Edgington et al. | 429/235 |
| 5,888,665 A * | 3/1999 | Bugga et al. | 429/40 |
| 6,077,623 A * | 6/2000 | Grosvenor et al. | 429/210 |
| 6,181,545 B1 * | 1/2001 | Amatucci et al. | 361/502 |
| 6,440,607 B1 | 8/2002 | Harada et al. | |
| 2003/0054244 A1 * | 3/2003 | Fredriksson et al. | 429/210 |
| 2003/0059664 A1 * | 3/2003 | Menjak et al. | 429/34 |

FOREIGN PATENT DOCUMENTS

| | | | |
|---|---|---|---|
| DE | 3739735 | * | 6/1989 |
| EP | 0491178 | | 6/1992 |
| EP | 0599603 | | 6/1994 |
| EP | 0630063 | | 12/1994 |
| JP | 55-059665 | | 5/1980 |
| JP | 01-204362 | | 8/1989 |
| JP | 03-088270 | | 4/1991 |
| JP | 5074479 | | 7/1993 |
| JP | 06-314567 | | 11/1994 |
| JP | 11-005277 | | 1/1999 |
| JP | 2000-348731 | | 12/2000 |

OTHER PUBLICATIONS

Z. Ye et al., "Ni-MH Battery Electrodes Made by a Dry Powder Process", Journal of the Electrochemical Society, vol. 142, No. 12, Dec. 1995.
Office Action received in counterpart Japanese Patent Appl. No. 2003-514648.

* cited by examiner

*Primary Examiner* — Patrick Ryan
*Assistant Examiner* — Ladan Mohaddes
(74) *Attorney, Agent, or Firm* — Capitol City TechLaw PLLC

(57) ABSTRACT

A biplate assembly may include a biplate, a negative electrode and a positive electrode. A method for manufacturing the biplate assembly may involve selecting the size of the biplate and arranging the positive electrode, which is formed by a compressed first powder, to a first side of the biplate. The first powder contains positive active material. The method may also involve arranging the negative electrode, which is formed by a compressed second powder, to a carrier arranged within the biplate assembly. The second powder contains negative active material. The carrier may be a side opposite to the first side of the biplate. The biplate assembly may be implemented in a bipolar battery.

12 Claims, 13 Drawing Sheets

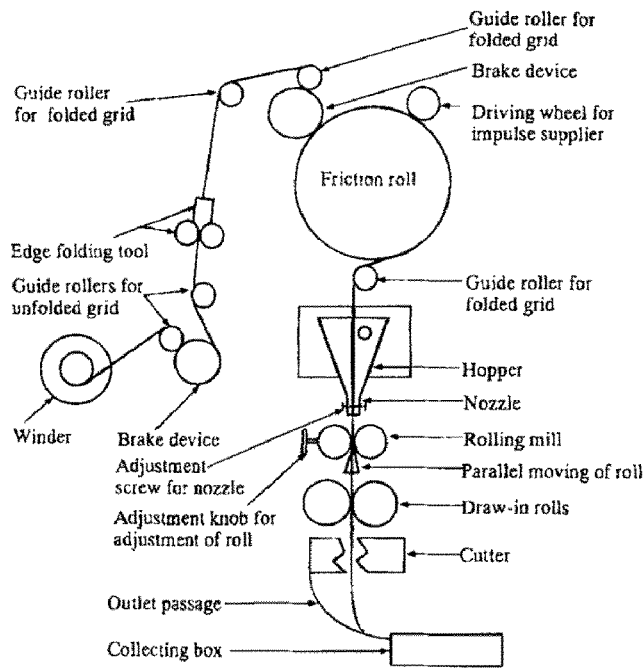
FIG. 8 Schematic diagram of the electrode-making equipment for the dry-powder method.
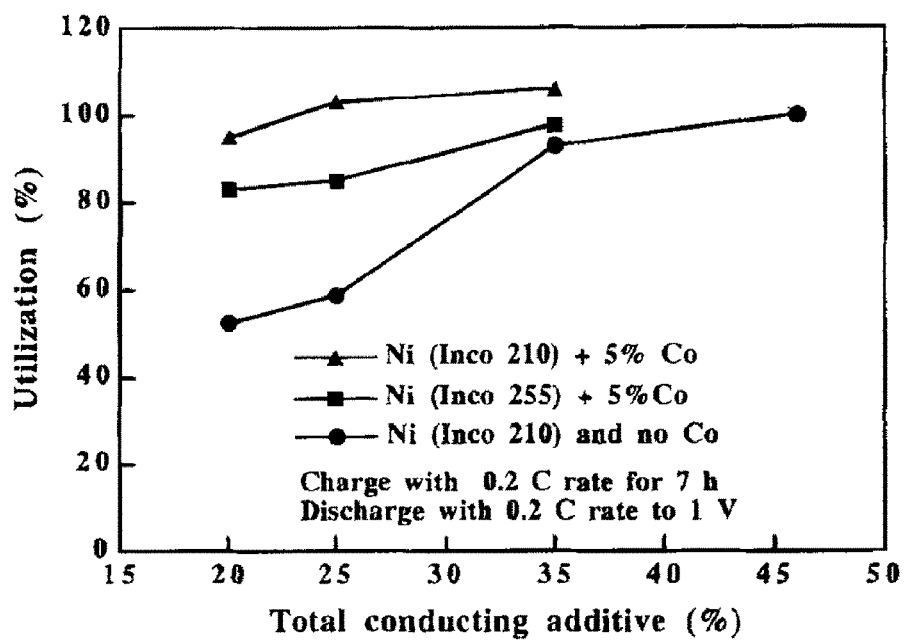
FIG. 9  The effects of Co additive and Ni quality on the utilization of nickel hydroxide at room temperature (the particle size of Inco 210 is finer than Inco 255).

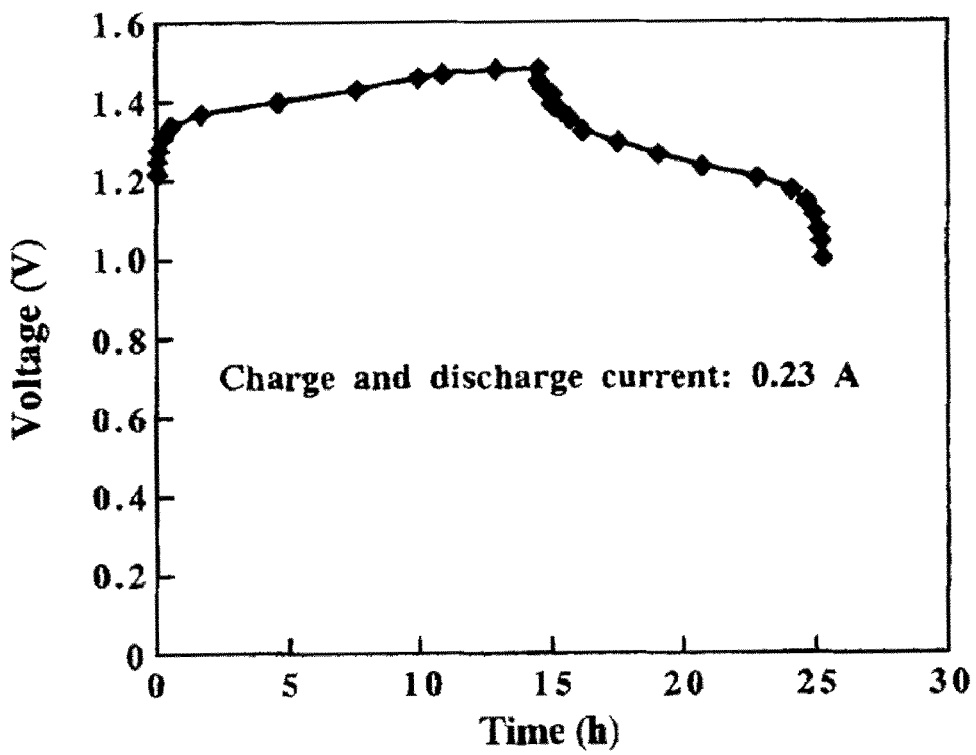
FIG. 10 The charge and discharge curves at room temperature.
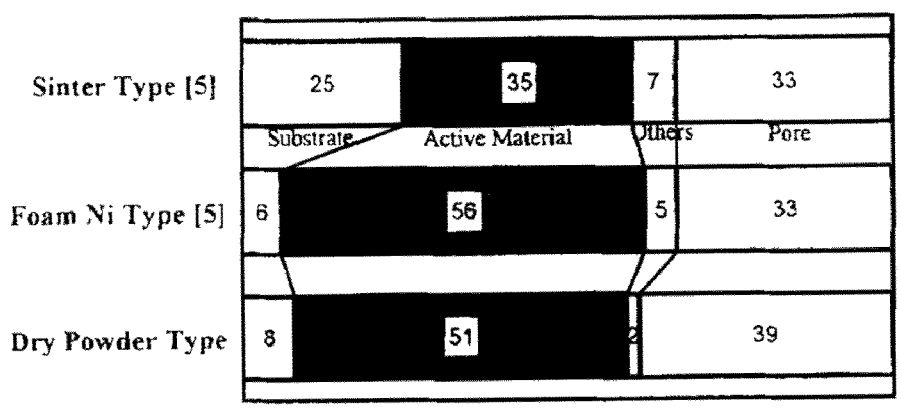
FIG. 11 The volume ratio of the components in the nickel electrodes made by different methods, sintered-type,[7] foamed-Ni type,[7] and improved dry powder type.

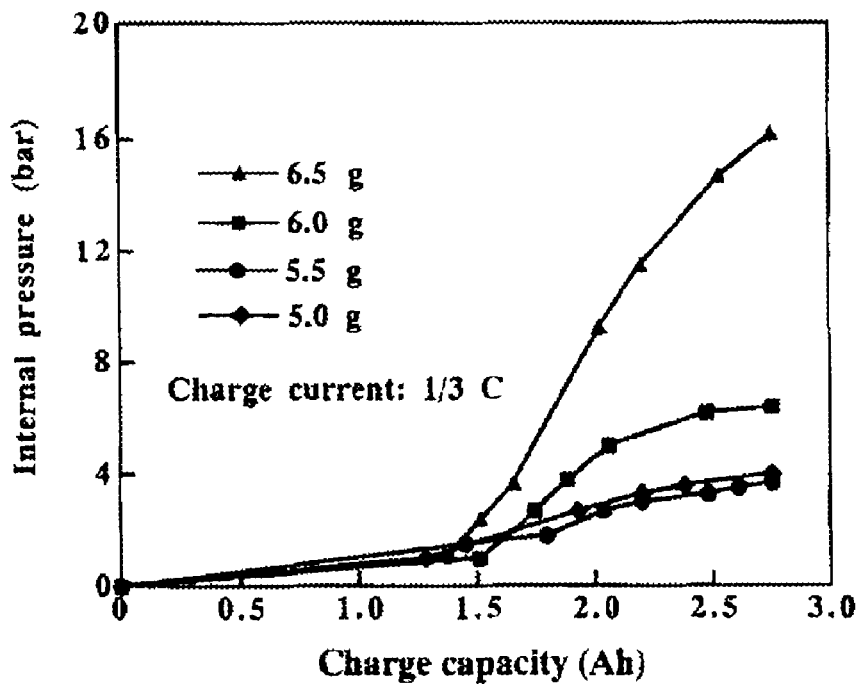
FIG. 12 The effect of the electrolyte amount on the internal pressure at room temperature.
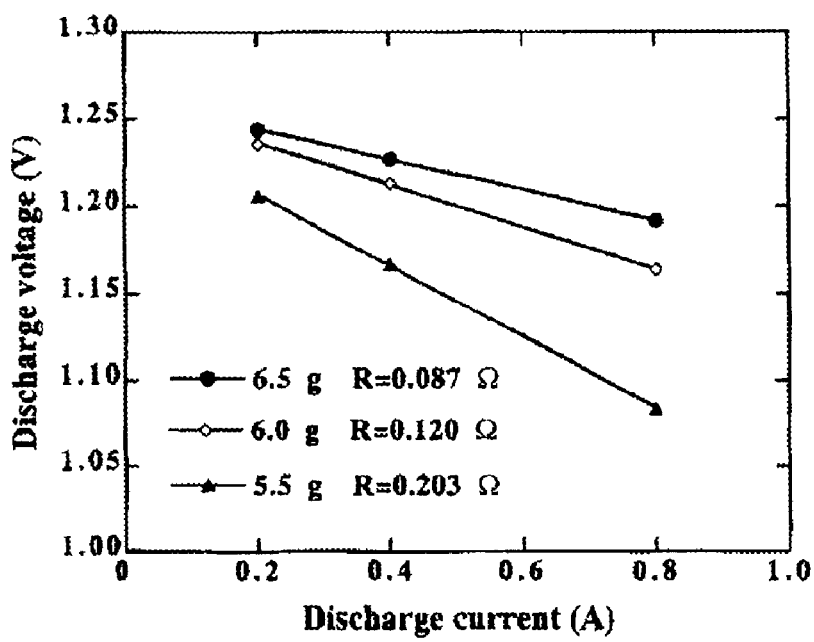
FIG. 13 The effect of the electrolyte amount on the internal resistance (R) at room temperature.

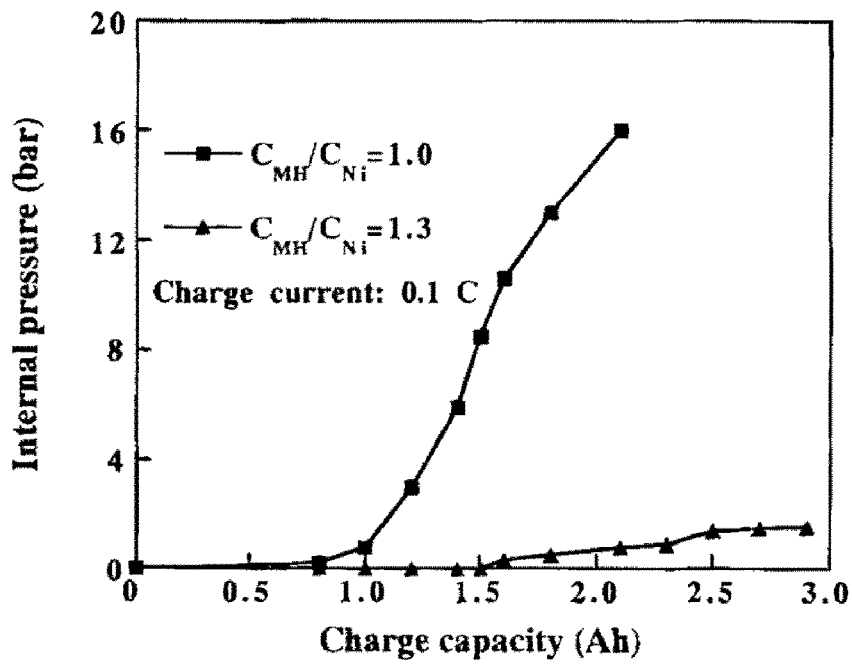
FIG. 14 The effect of the capacity ratio of MH-electrode to Ni-electrode on the internal pressure at room temperature.
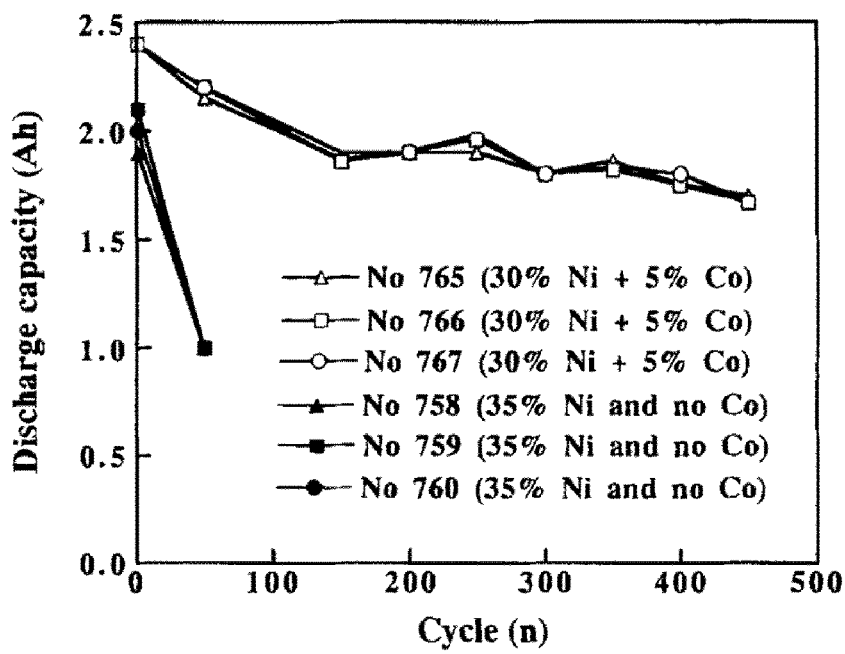
FIG. 15 The effect of Co addition to the nickel electrode on the cycle life at room temperature.

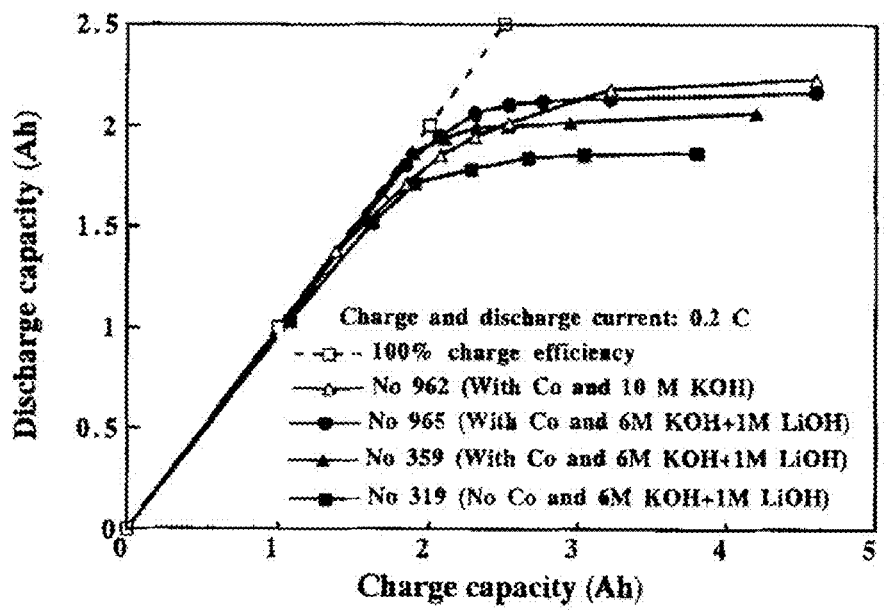
FIG. 16 The discharge capacity vs. charge capacity at room temperature for various cells using Co-free and Co-added Ni electrodes.
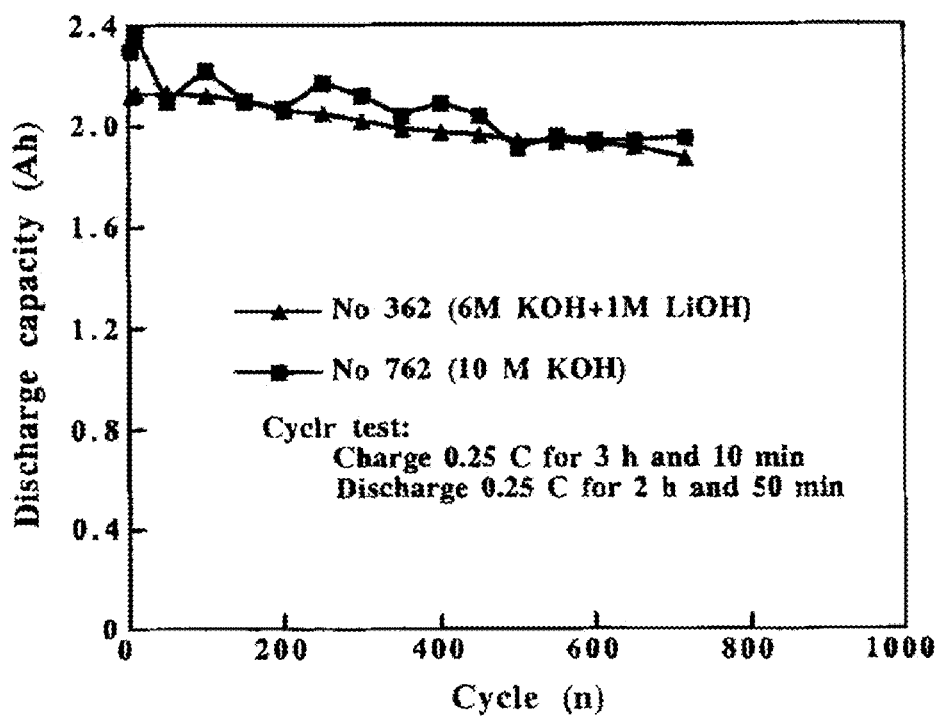
FIG. 17 The cycle life of the batteries at room temperature.

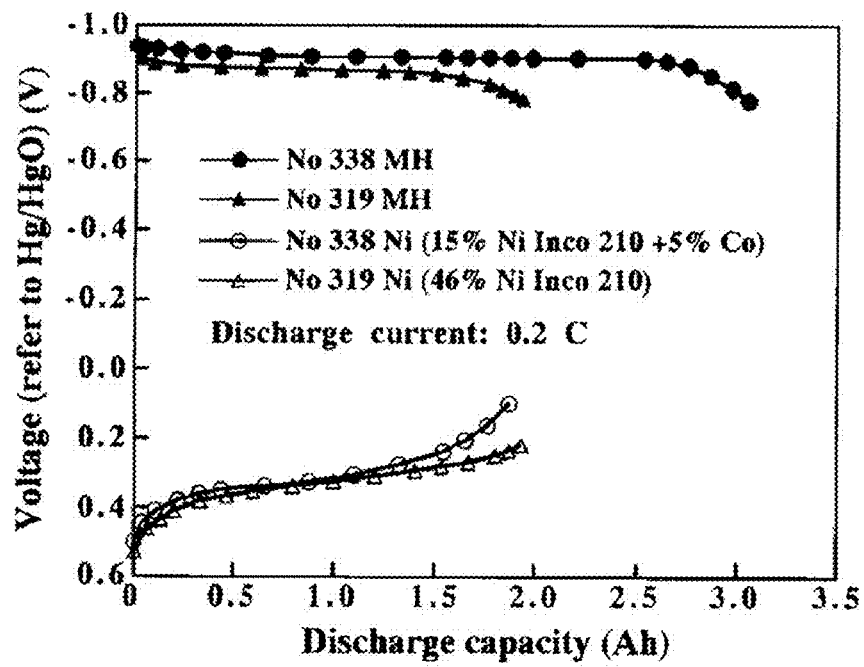
FIG. 18  The discharge voltage vs. discharge capacity for each electrode after 350 cycles at room temperature for cells using the Co-free and Co-added Ni electrodes.
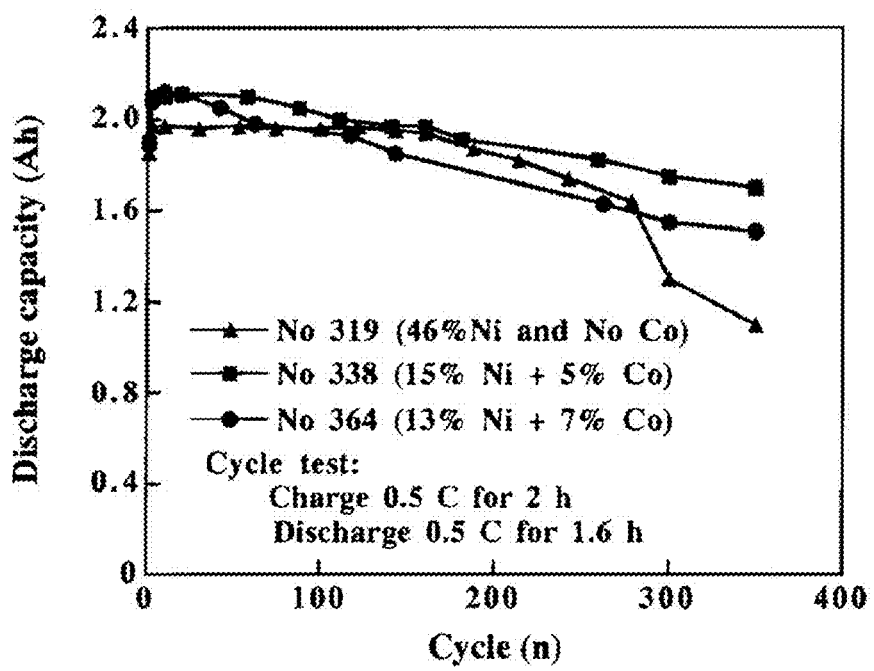
FIG. 19  The cycle life of some batteries at room temperature for cells using the Co-free and Co-added Ni electrodes.

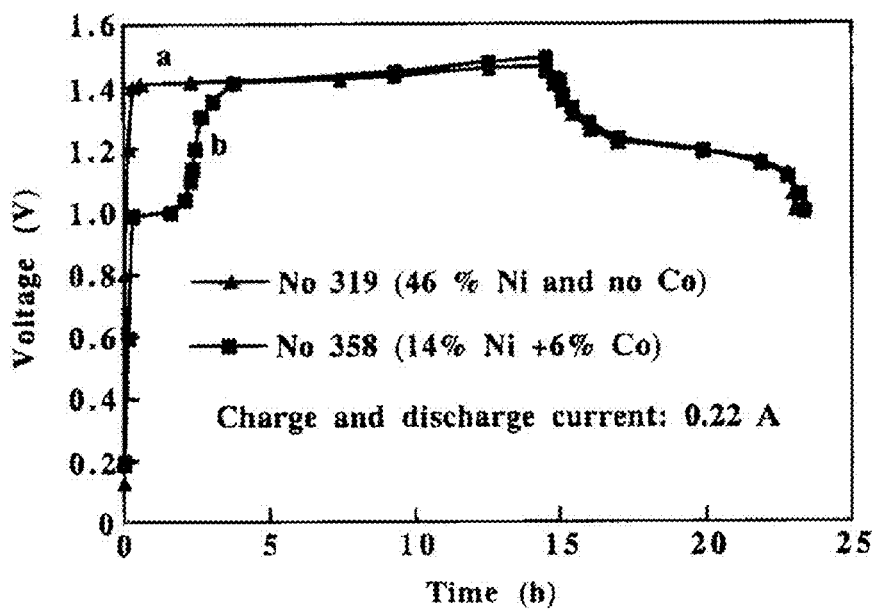
FIG. 20 The first activation charge/discharge curve for two different batteries at room temperature for cells using the Co-free and Co-added Ni electrodes.
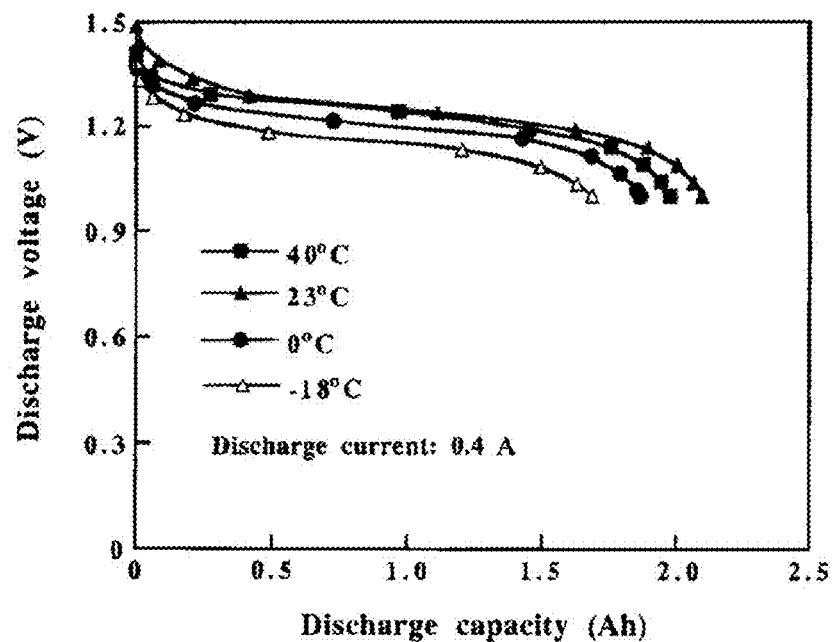
FIG. 21 The discharge voltage vs. discharge capacity for battery No. 359 (6 M KOH + 1 M LiOH) after 250 cycles at different temperatures.

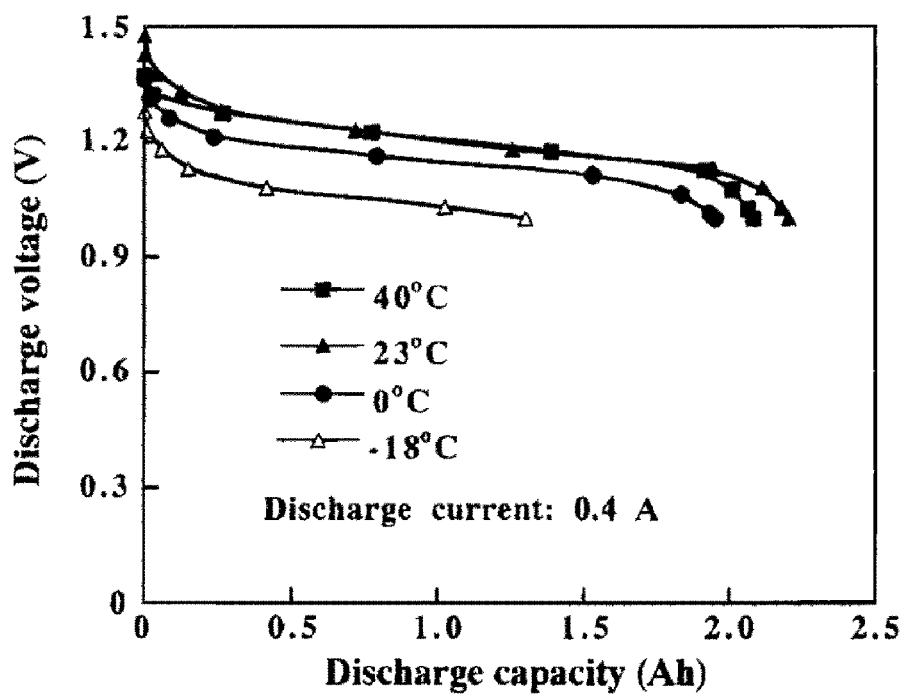
FIG. 22 The discharge voltage vs. discharge capacity for battery No. 961 (10 $M$ KOH) at different temperatures.
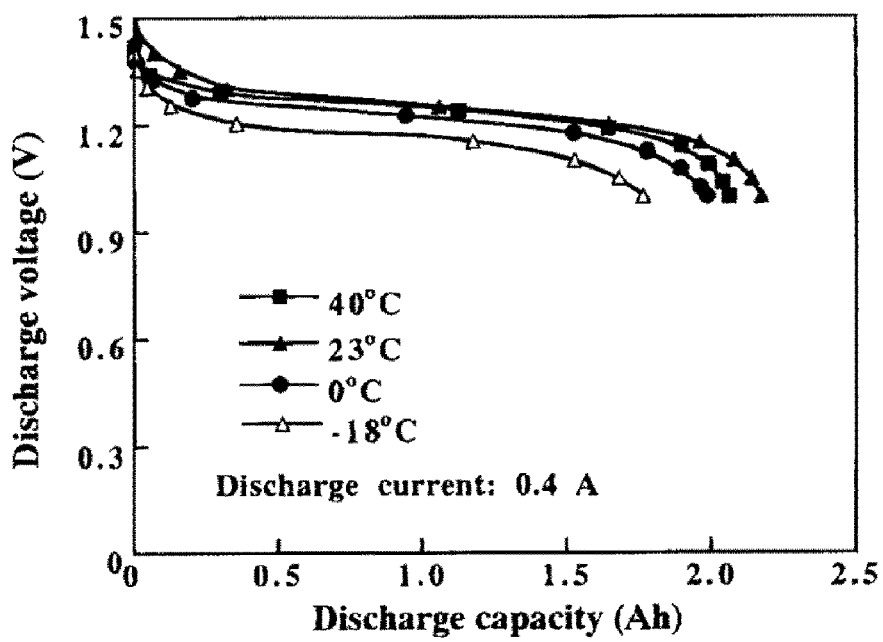
FIG. 23 The discharge voltage vs. discharge capacity for battery No. 966 (6 $M$ KOH + 1 $M$ LiOH) at different temperatures.

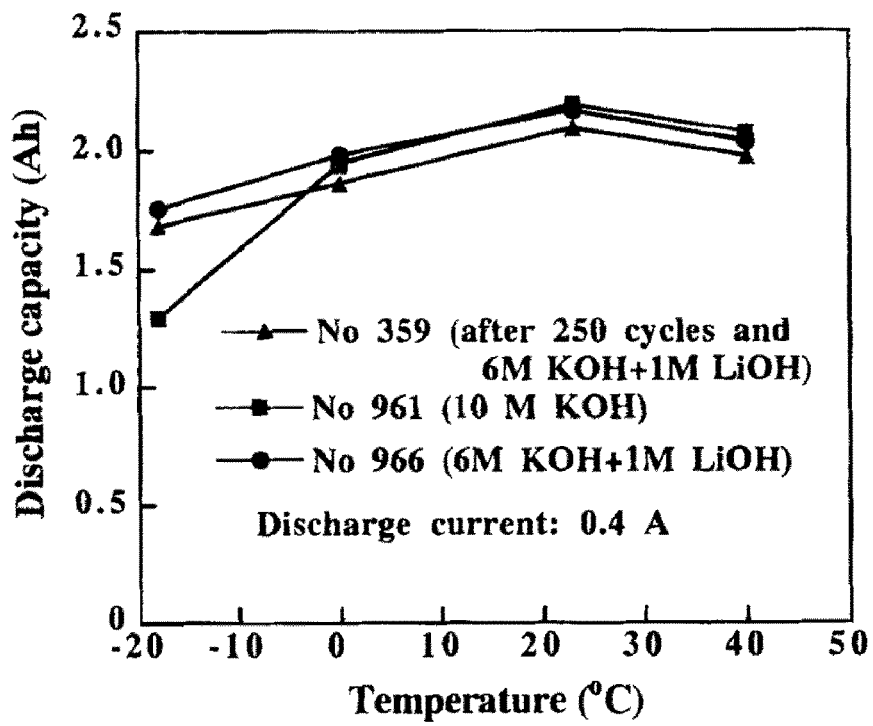
FIG. 24 The effect of the discharge temperature on the discharge capacity.
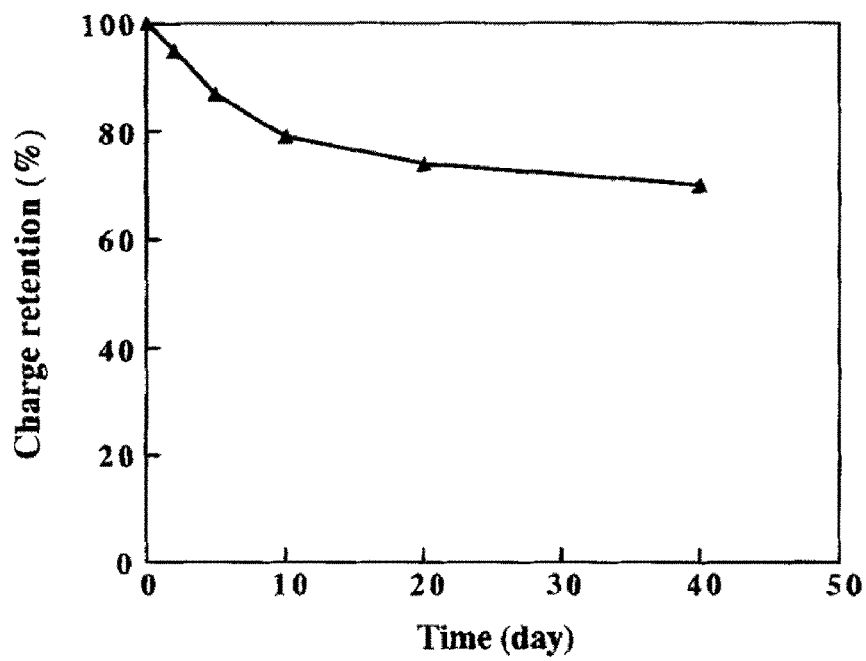
FIG. 25 The self-discharge performance at room temperature.

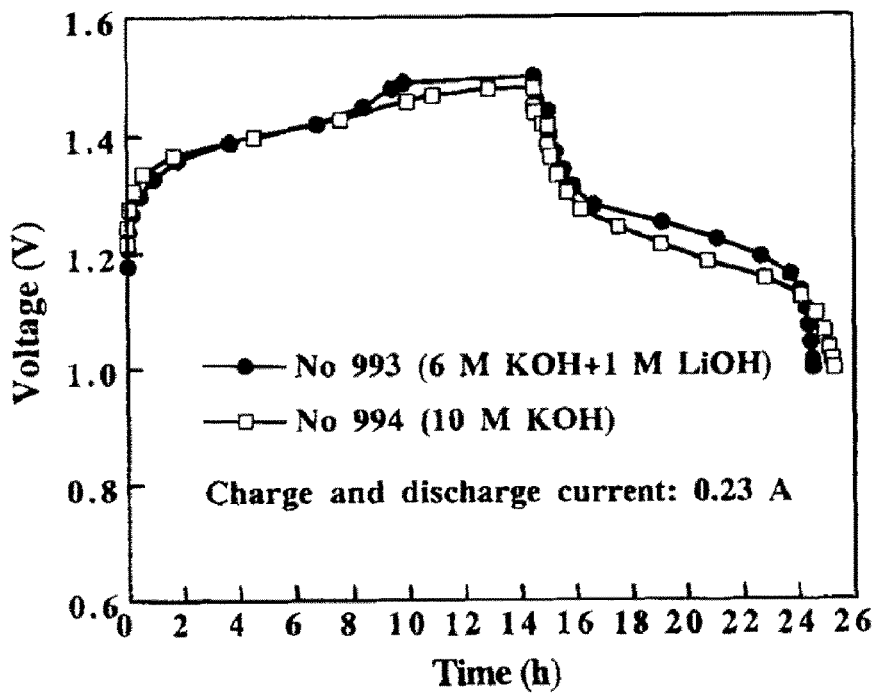
FIG. 26 The charge and discharge voltage vs. time for cells using different electrolytes at room temperature.
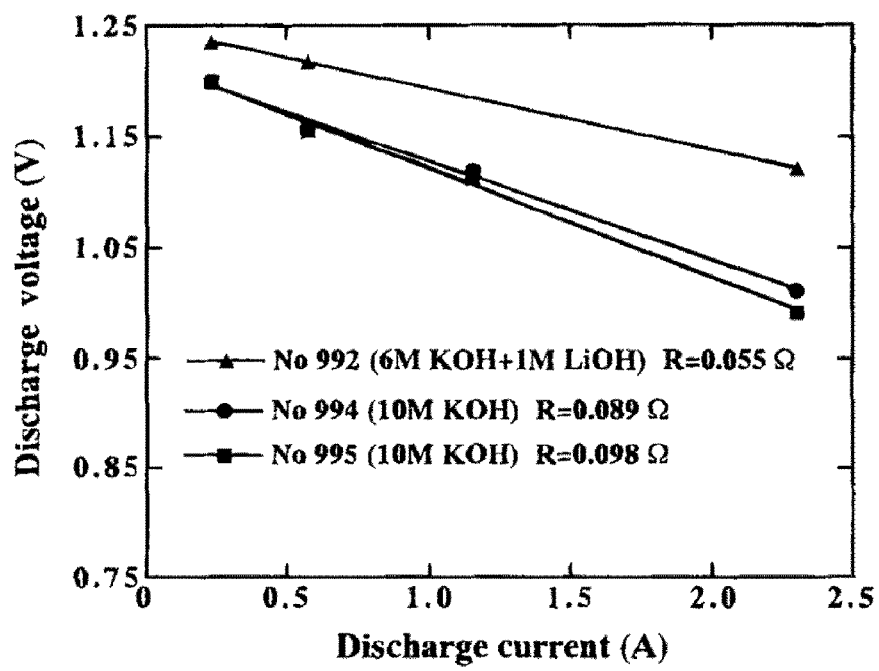
FIG. 27 The discharge voltage vs. discharge current relation for cells using different electrolytes at room temperature.

METHOD FOR MANUFACTURING A BIPLATE ASSEMBLY, A BIPLATE ASSEMBLY AND A BIPOLAR BATTERY

TECHNICAL FIELD

The present invention relates to a method for manufacturing a biplate. The invention also relates to a biplate assembly, and a bipolar battery made up from at least one biplate assembly.

BACKGROUND TO THE INVENTION

Bipolar batteries have been used to improve battery energy storage capacity on a weight and volume basis, to reduce packing weight and volume, to provide stable battery performance and low internal resistance.

A bipolar battery construction comprises an electrically conductive bipolar layer, a so called biplate, that serves as electrical interconnection between adjacent cells in the battery as well as a partition between the cells. In order for the bipolar construction to be successfully utilized, the biplate must be sufficiently conductive to transmit current from cell to cell, chemically stable in the cell's environment, capable of making and maintaining good contact to the electrodes and capable of being electrically insulated and sealable around the boundaries of the cell so as to contain electrolyte in the cell.

These requirements are more difficult to achieve in rechargeable batteries due to the charging potential that can accelerate corrosion of the biplate and in alkaline batteries due to the creep nature of electrolyte. Achieving the proper combination of these characteristics has proven very difficult. For maintenance-free operation it is desirable to operate rechargeable batteries in a sealed configuration. However, sealed bipolar designs typically utilize flat electrodes and stacked-cell constructions that are structurally poor for containment of gases present and generated during cell operation. In a sealed construction, gases generated during charging then need to be chemically recombined within the cell for stable operation. The pressure containment requirement creates additional challenges on designing a stable bipolar configuration.

In a bipolar battery there is, as mentioned above, a need for electrodes that should be in good contact with the biplate. Presently, the negative and positive electrode being in contact with the biplate are manufactured separately and treated in such a way to improve contact with the biplate when attached to it. Such treatments are disclosed in U.S. Pat. No. 5,611,823, by Klein, where the electrodes are manufactured from electrochemically active material prepared by coating non- to low-conductive particles of a metal hydroxide or metal oxide powder with nickel using a electroless nickel coating process.

Other treatments to manufacture individual robust, positive and negative electrodes is to utilize a current collecting grid for the dual purpose of supporting the electrochemically active materials, and conducting the electric current from the electrode via the conductive grid.

Pressed powder has previously been used when manufacturing separate electrodes. An article, *Ni-MH Battery Electrodes Made by a Dry Powder Process* was published in the Journal of the Electrochemical Society, Vol. 142, Number 12, December 1995 ("the ECS article"), and is hereby incorporated by reference. Relevant disclosure from the ECS article is bodily incorporated below in paragraphs [0008-20] and in FIGS. 8-27.

The high specific capacity of the Ni-MH battery and the rapidly increasing demand for secondary batteries have led to a rapid increase in the production of Ni-MH batteries. In Japan, the output has doubled each year. For 1994, it reached 206 million cells. In the future, the Ni-MH battery may also be an alternative for electric and hybrid vehicles. For a continuing growth of the Ni-MH market share it is, however, important to reduce the cost of the batteries.

The relative simplicity of the electrode reactions in the Ni-MH battery can help to develop attractive and low-cost batteries. Both electrode reactions according to Equations 1-3, infra, are solid-state intercalation reaction of hydrogen. When the cell is charged, hydrogen is transferred from the $Ni(OH)_2$, which forms NiOOH, to make a water molecule at the electrode surface with an OH$^-$ ion from the electrolyte. At the metal hydride (MH) electrode another water molecule is decomposed and a hydrogen atom is intercalated and stored in the MH electrode. When the cell is discharged, the procedure is reversed. In contrast to the Ni—Cd and lead-acid batteries, no water is produced or consumed in the overall cell reactions, and the amount of the electrolyte is thus constant and it participates only as an ionic charge carrier. The metal hydride is further a good electronic conductor both in its charged and discharged state. The main problem is the positive electrode where $Ni(OH)_2$ is an insulator in the discharge state of the electrode. A substantial part of the work presented by the authors of the ECS article, Ye et al. (collectively "the researchers") was, therefore, aimed at improving the conductivity properties of this electrode. Both electrodes were, however, made by cold-pressing dry electrode powder onto an endless metal net, which was a method developed by Svenska Ackumulator AB Jungner in Sweden, in the beginning of 1970s, for the mass production of low cost Ni—Cd consumer batteries. In the present project the same roller pressing equipment was used to produce electrodes for the researchers' Ni-MH test cells. In the beginning of the 1970s, as much as 46 weight percent (w/o) carbonyl nickel powder had to be added to the positive electrode as a binder as well as to enhance the conductivity, in order to obtain good utilization of the nickel hydroxide and an acceptable rate capability for the produced batteries, which increased cost and weight. But now, due to improved nickel hydroxide and carbonyl nickel qualities and the positive influence of Co addition on the performance of the nickel hydroxide, the researchers thought it would be possible to produce commercial batteries by this method, with a performance that can be compared to that of batteries made by Ni foam/felt methods. Furthermore, this dry powder method is more environmentally acceptable than Ni-sinter technologies because it includes no wet chemical steps and reduces spillage and disposal of by-products.

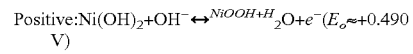

[1]

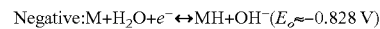

[2]

[3]

An electrode manufacturing method, originally developed for the production of low cost Ni—Cd cell, has been modified to produce electrodes for Ni-MH cell (sub-C size) in the range 1.5-2.5 Ah. The earlier process reported in U.S. Pat. No. 3,640,772 was dependent on a special treatment of the active material with a polymer dissolved in a solvent. In this treatment, a slurry was made with the active materials and the wet additives after which the solvent was evaporated and the polymer-treated active material formed a solid which was ground into a suitable particle size. In the process described in this paper there is no need for this treatment of the active material. The high-density nickel hydroxide powder and the mischmetal hydrogen storage alloy powder, mixed with certain amount of fine nickel and cobalt metal powder, are directly fed to both sides of a continuous net of woven pure nickel wire at ambient temperature and compacted in an air atmosphere to make electrodes in the form of "endless" bands. No sintering step is needed. The roller pressing equipment is schematically shown in FIG. 8. Finally the bands are cut into suitable electrode lengths. The electrical leads are connected by spot welding and the electrodes are directly coiled together with a separator and inserted into battery cans with a sealing lid for the subsequent evaluation.

The battery characteristics were examined with a PC-controlled multichannel battery charge/discharge system which allows each charge/discharge cycle to be recorded with a 10 mV measuring step and stored on the hard disk of a computer. Time and voltage could both be controlled, and the current could be varied from 10 mA to 20 A. The non-ambient temperature performance of some batteries was measured at the Electrolux Battery Center in Stockholm, Sweden.

The active materials used in this test, i.e., hydrogen storage alloy $MmNi_{3.6}Co_{0.7}Al_{0.35}Mn_{0.35}$ (Mm; 50-60 w/o La, 30-40 w/o Ce, and about 10 w/o Nd and Pr) and nickel hydroxide (containing 2-4 w/o Co and 3-6 w/o Zn), were generously supplied by Gesellschaft fur Elektrometallurgi in Nürnberg, Germany, and Tanaka Chemical Corporation in Fukui, Japan, respectively. Carbonyl nickel powder (Inco 255, 210) and cobalt powder (MHO extra fine) were used as binders and as conducting additives in both electrodes. The MH electrode composition was fixed at 85 w/o $AB_5$ alloy, 10 w/o Ni, and 5 w/o Co. The carbonyl nickel content in the positive electrode was varied from 46 to 15 w/o, and the effect of cobalt addition was investigated up to 7 w/o. The effects of two kinds of electrolyte were tested, 6 M KOH+1 M LiOH and 10 M KOH which was used in Ni—Cd cells in 1970s. A polyamide nonwoven cloth with thickness 100 μm (FT2119) in two layers was used as separator.

During the work for the ECS article, the researchers came to the conclusion that the positive $Ni(OH)_2$ electrode is in many aspects the weak partner in the Ni-MH battery couple. And because the battery must be Ni-electrode limited in order to enable proper recombination reactions, the researchers put much emphasis on the optimization of this electrode. To improve the electronic conductivity, carbonyl nickel was added to the $Ni(OH)_2$ so that the fine nickel particles form a dendritic structure when pressed together with the $Ni(OH)_2$. Cobalt was also added to improve charge efficiency and utilization. FIG. 9 shows the importance of Co addition and the influence of two different nickel powder qualities (Inco 210 and 255) on the $Ni(OH)_2$ utilization. The utilization of the $NiOOH \leftrightarrow Ni(OH)_2$ reaction refers to a theoretical value of 289 mAh/g of $Ni(OH)_2$ after subtracting the weight of the coprecipitated $Zn(OH)_2$. This $Zn(OH)_2$ addition (amounting to 3.5 w/o) is made by the producer of our starting material in order to suppress a formation of γ-NiOOH which causes electrode swelling and a dry out of the separator upon cycling. The Co additive is further especially important when the amount of conducting Ni powder is reduced. In FIG. 9, the researchers also found that finer grain size Ni (Inco 210) is more effective for increasing the utilization. With this type of powder-pressed electrode the researchers were able to reach a specific capacity of 550 mAh/cm$^3$ at a 0.2 C discharge rate. This is close to what can be obtained with Ni-foam/felt technology. FIG. 10 shows the charge and discharge voltage of an initially optimized battery at a 0.1 C rate. It can be seen that the capacity of the battery is close to 2.4 Ah (i.e., 180 Wh/dm$^3$, 56 Wh/kg) and almost the same as the present commercial cells. This fairly good value can be understood after seeing FIG. 11, where the volume ratio of active material in the three electrode types is compared. The amount of active material in the powder pressed electrode is only about 5 volume percent (v/o) lower than in the foam/felt electrodes leading to comparable total capacities for cells using these two electrode types.

The loss of cycle life is usually caused by a loss of the electrolyte, resulting in a dry out of the cells. A primary cause for electrolyte dry out, which is common for both Ni-MH and Ni—Cd cells, is the incorporation of water molecules in the nickel hydroxide, leading to a swelling of the electrode and a removal of the electrolyte from the separator. Also the corrosion of the metal hydride consumes the electrolyte as well as poor recombination reactions which cause excessive cell pressures and a venting of the cells through the safety valve. In the final stage of the life-span of a hydride battery, both of the latter processes usually occur; this is the reason for the fairly rapid decay of the hydride battery capacity when the battery nears the end of its life expectancy. A typical hydride battery initially has a fairly stable capacity over several hundreds of cycles but eventually reaches a sudden reduction, compared to the Ni—Cd battery where the capacity reduction sets in earlier but is more gradual.

To emulate a suitable starved electrolyte, the researchers varied the amount of electrolyte added and recorded its influence on the internal pressure and internal resistance, as seen in FIGS. 12 and 13. The pressure was measured by removing the safety valve and connecting the cell to an external pressure gauge. With decreasing amounts of electrolyte, the internal pressure decreased as shown in FIG. 12, while the internal resistance increased as shown in FIG. 13, indicating an optimized amount of electrolyte of about 6 g. To prevent the pressure rise during overcharge, an excess of the metal hydride to the nickel electrode ($C_{MH}/C_{Ni}$=1.3) is also needed. This facilitates the recombination reaction of oxygen as well as suppressing a side reaction evolving hydrogen gas at the negative electrode, as can be seen in FIG. 14.

At the beginning, the cycle life was tested by using the IEC standard for Ni—Cd batteries, which means that the cells were charged at the 0.25 C rate for 3 h and 10 min and discharged at the 0.25 C rate for 2 h and 20 min as shown in FIG. 15 (A 1 C rate would correspond to a current that would charge the cell to its nominal capacity during 1 h). The researchers thought, however, that some of the capacity drop is due to an extensive overcharge caused in this IEC standard. The very good charge efficiency of the hydride batteries makes the rather extensive overcharging used for Ni—Cd cells unnecessary. The charge and discharge efficiency for the cells is shown in FIG. 16. Up to about 2.16 Ah of charge input or about 90% of the full 2.4 Ah charging capacity, the charge efficiency is very close to 100%. This is a very important advantage when making large cells, as the amount of dissipated heat that has to be removed can be kept very low, if the cells are not overcharged. This also means that the IEC standard for cycling Ni—Cd cells is not suitable, as it will overcharge the batteries for almost an hour during each cycle. By increasing the discharge time to 2 h and 50 min we could notably reduce the loss of cyclic capacity by removing charge from the cells and thus reducing the amount of overcharge in the subsequent cycle as shown in FIG. 17.

The cobalt addition to the positive electrode, especially at low carbonyl nickel content, was found to be beneficial for the cycle life. As seen in FIG. 15, a 35 w/o addition of carbonyl nickel gives a fairly high utilization, but a very poor cycle life. If 5 w/o of the nickel is replaced by cobalt, the utilization is further increased and the cycle life is dramatically improved. The formation of conducting CoOOH became more important for increasing the charging and discharging efficiencies of the Ni(OH), when the carbonyl nickel content was decreased. Furthermore, the Co addition to the positive electrode influences not only this electrode directly, but also indirectly the negative hydride electrode. FIG. 18 compares the remaining capacity in two sealed cells that have been cycled 350 times at a 0.5 C rate, charging for 2 h and a 0.5 C rate, discharging for 1.6 h. After cycling, the cells were opened and refilled with electrolyte and the discharge curves of both electrodes were measured against an Hg/HgO reference electrode. Initially both cell No. 319 and No. 338 had the same negative overcapacity. After the cycling the negative overcapacity of the cell No. 319 using a Co-free nickel electrode has been lost. In the end, the No. 319 cell became hydride electrode limited. This is the reason that batteries using cobalt-free nickel electrodes quickly lost their capacity as seen in FIGS. 15 and 19. The researchers attributed this corrosion to a poorer charge efficiency of the Co-free Ni electrode, as seen in FIG. 16, causing an evolution of oxygen, which has a detrimental effect on the hydride electrode when it is not fully charged. This is also indicated by the different activation processes for the two kinds of batteries using Co-added and Co-free nickel electrodes. In FIG. 20, the first charge/discharge curves of two different batteries are shown. The form of the charge curves are quite different. The first step of about 1 V in curve b (Co-added nickel electrode) is attributed to the reaction $Co(OH)_2 \leftrightarrow CoOOH$ and $M \leftrightarrow MH$. At this voltage, almost no oxygen evolution is expected and the hydrogen storage alloy is prevented from oxidization. When the cell is more fully charged, the evolved oxygen can be recombined with the hydrogen in the metal hydride, thus preventing the negative electrode from corroding. But when no Co has been added to the positive electrode, the charge voltage, even at the beginning, is higher (1.4 V) as shown in curve a. At this voltage, oxygen can be evolved at the Ni-electrode and react with the hydrogen storage alloy in the MH-electrode.

The temperature performance was measured at the Electrolux RI Battery Centre in Stockholm, Sweden. FIGS. 21-23 show the discharge curves of the batteries at different temperatures. The cells were charged at room temperature at the 0.2 C rate and rested for at least 2 h, during which time the discharge temperature was established. Cell No. 961 (FIG. 15) had a 10 M KOH electrolyte. Cell No. 359 (FIG. 21) and No. 966 (FIG. 23) had a (6 M KOH+1 M LiOH) electrolyte; cell No. 359 had been through a test with 250 full charge and discharge cycles at a 0.5 C rate before this temperature experiment was done. Comparing the discharge voltage in FIGS. 21 and 23, it is interesting to note that no significant increase in the internal resistance could be observed as a result of these initial 250 cycles. The temperature dependence of the discharge capacity as shown in FIG. 24 was found to be rather flat between −18 and 40° C., except for battery No. 961 with a 10 M KOH electrolyte, where the increased internal resistance at low temperature significantly reduced the capacity at −18° C.

FIG. 25 shows the charge retention at 20° C. The charge retention of the battery was measured as follows. The battery was charged at a 0.1 C rate for 15 h; the charged battery was kept at room temperature for the number of days plotted in the FIG. 25, after which the battery was discharged at a 0.2 C rate to 1 V. The self-discharge rate of the batteries was not large, and we think it can be further improved by replacing the polyamide separator with sulfonated-polypropylene separator.

Two electrolytes, 6 M KOH+1 M LiOH and 10 M KOH which was used in Ni—Cd cells in the 1970s were tested. The 10 M KOH gave a little higher initial capacity as shown in FIG. 26, but also a lower discharge voltage (FIGS. 22 and 26) and a higher internal resistance as shown in FIG. 27. The low temperature performance of the battery with a 10 M KOH electrolyte was very poor as shown in FIGS. 22 and 24.

SUMMARY OF THE INVENTION

The object of the present invention is to provide a method for manufacturing a biplate assembly having a reduced weight, a reduced size and a maintained or improved battery energy storage capacity compared to prior art.

This object is achieved by utilizing a manufacturing method whereby compressed powder electrodes are provided on opposite sides of a conductive biplate, a biplate assembly having compressed powder electrodes provided on an electrode area that may be provided with increased surface roughness and bipolar batteries incorporating such biplate assemblies and manufacturing using the disclosed method.

An advantage with the present invention is that a biplate assembly may be obtained, where each electrode may have a thickness ranging from 0.1-1.0 millimeter, especially for power applications, thus reducing the weight and volume of each biplate assembly and as a result reducing the weight and volume of the complete bipolar battery. For other applications the thickness of each electrode may exceed 1.0 millimeter.

Another advantage with the present invention is that it is possible to manufacture less costly batteries than present batteries, due to the manufacturing method. Another advantage with the present invention is that more uniform electrodes may be created, thereby shortening the current paths within each electrode.

Still another advantage is that fewer parts are needed to manufacture the biplate assembly, since no grids are required, and no intercell components are required in a bipolar battery. This lowers the manufacturing cost considerably.

An advantage with an embodiment of the present invention is that the characteristics of the battery, including the electrodes according to the invention, will be improved since an improved efficiency due to better conductive paths between the biplate and the electrodes are achieved when the electrodes are manufactured directly on the biplate.

Still an advantage with an embodiment of the present invention is that the internal resistance within an electrode is reduced due to providing a three-dimensional roughness on the biplate, the biplate either carrying the electrodes or being arranged adjacent to an electrode when mounted in a bipolar battery.

A further advantage with an embodiment of the present invention is that the internal resistance within an electrode is further reduced by providing conductive fibers to the positive active material (PAM) and the negative active material (NAM).

The reduction in internal resistance will cause less heat to be generated, thereby further improving the characteristics of the biplate assembly.

Further objects and advantages of the present invention will be apparent to those skilled in the art from the following detailed description of the disclosed bipolar electrochemical battery and the methods for producing biplate assemblies having pressed electrodes.

BRIEF DESCRIPTION OF THE DRAWINGS

FIG. 8 shows a schematic diagram of an apparatus for manufacturing electrode strips using a dry powder method.

FIG. 9 shows the effects of Co additive and Ni quality on the utilization of $Ni(OH)_2$ at room temperature.

FIG. 10 shows the charge and discharge curves at room temperature.

FIG. 11 shows the volume ratio of components in nickel electrodes manufactured by various methods.

FIG. 12 shows the effect of electrolyte quantity on internal pressure at room temperature.

FIG. 13 shows the effect of electrolyte quantity on internal resistance at room temperature.

FIG. 14 shows the effect of the capacity ratio of the MH-electrode to the Ni-electrode on internal pressure at room temperature.

FIG. 15 shows the effect of Co addition to the Ni-electrode on the cycle life at room temperature.

FIG. 16 shows the discharge capacity vs. the charge capacity for various Ni-electrode embodiments at room temperature.

FIG. 17 shows the cycle life of the tested batteries at room temperature.

FIG. 18 shows the discharge voltage vs. the charge capacity for various Ni-electrode embodiments after 350 cycles at room temperature.

FIG. 19 shows the cycle life of the tested batteries for various Ni-electrode embodiments at room temperature.

FIG. 20 shows the first activation charge/discharge curve for various Ni-electrode embodiments at room temperature.

FIG. 21 shows the discharge voltage vs. the discharge capacity for battery 359 after 250 cycles at various temperatures.

FIG. 22 shows the discharge voltage vs. the discharge capacity for battery 961 at various temperatures.

FIG. 23 shows the discharge voltage vs. the discharge capacity for battery 966 at various temperatures.

FIG. 24 shows the effect of discharge temperature on the discharge capacity.

FIG. 25 shows the self-discharge performance at room temperature.

FIG. 26 shows the charge and discharge voltage vs. time for cells using various electrolytes at room temperature.

FIG. 27 shows the discharge voltage vs. the discharge current for cells using various electrolytes at room temperature.

DETAILED DESCRIPTION OF PREFERRED EMBODIMENTS

Figure 1A:
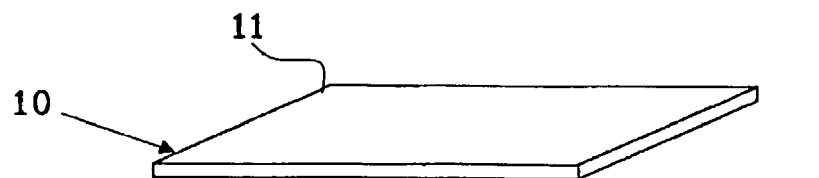
FIGS. 1a-1g shows a manufacturing process of a biplate assembly according to the present invention.

FIGS. 1a-1g show a manufacturing process to obtain a biplate assembly according to the present invention. FIG. 1a shows a biplate 10 having a first side 11 and a second side 12, which size is selected dependent on the application.

A too large biplate will cause no, or bad, heat transition away from the biplate. An increased temperature will degenerate the capacity of the bipolar battery, where the biplate assembly is mounted, due to that the electrolyte present between two biplate assemblies is tied up to the positive electrode of the biplate assembly causing more heat to generate, and so on. So it is important that the site of the biplate is selected with care to avoid the above described heat transition problem.

Figure 1B:
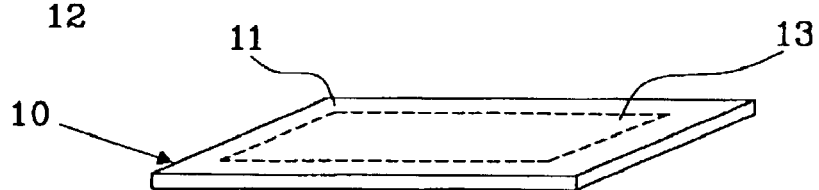

FIG. 1b shows the next step in the manufacturing process where a first limited area 13 is selected on the first side 11 of the biplate 10, where a first electrode is to be formed.

Figure 1C:
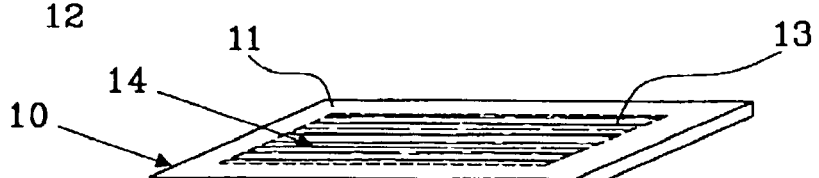

FIG. 1c shows an optional step in the manufacturing process, where at least the limited area 13, selected in FIG. 1b, is treated in such a way to obtain a three-dimensional roughness 14. This way the surface area, where the first electrode is to be formed, is increased. Furthermore the roughness will also make it easier to keep the electrode in place, since the electrode is mainly made out of a pressed powder.

Figure 1D:
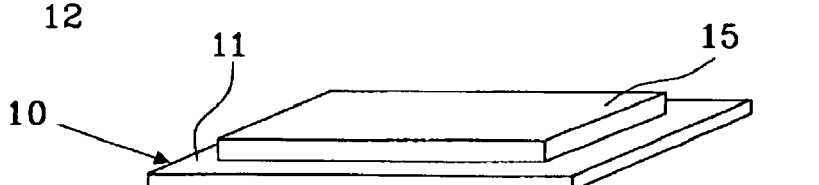

FIG. 1d shows the next step where the first electrode 15, e.g., the positive electrode, is created by pressing a first powder compound, containing a Positive Active Material (PAM), onto the first side 11 of the biplate 10.

Figure 1E:
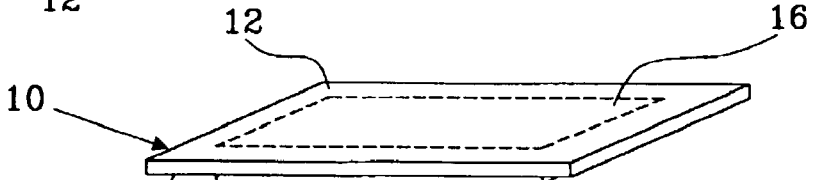

FIG. 1e shows the next step where the biplate 10 has been turned up side down, i.e., the positive electrode 15 is facing down and the second side 12 is facing up. A second limited area 16, is selected, which preferably has the same size as and is arranged directly opposite to the first limited area 13.

Figure 1F:
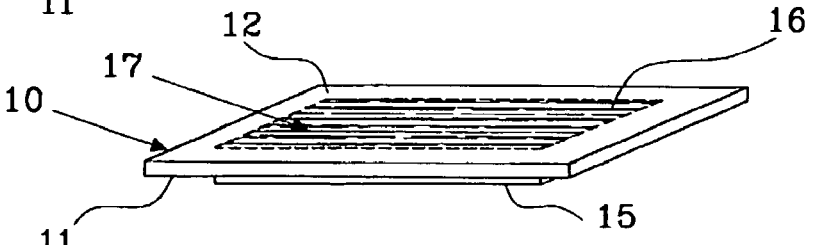

FIG. 1f shows another optional step where the same treatment is performed as described in connection with FIG. 1c, obtaining a three-dimensional roughness 17 similar to the one in FIG. 1c.

Figure 1G:
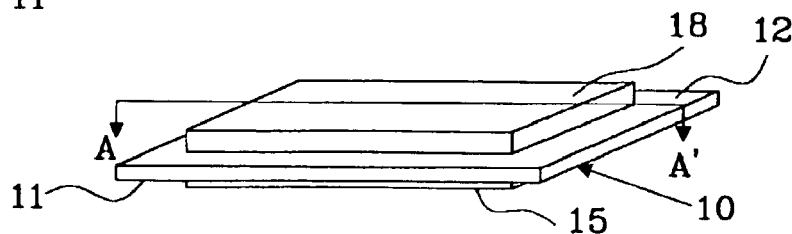

FIG. 1g shows the final step in the manufacturing process where a second electrode 18, e.g., the negative electrode, is created by pressing a second powder compound, containing a Negative Active Material, onto the second side 12 of the biplate 10.

Thus, a complete biplate assembly is made including a biplate, a positive electrode and a negative electrode, which are created by depositing and pressing powder directly onto the biplate. This makes it possible to manufacture very thin electrodes, having a thickness ranging from 0.1 to 1.0 millimeter, preferably in the range 0.25 to 0.5 millimeter. This approach is essential when manufacturing bipolar batteries for power applications. In other applications where it is desirable to extract energy from the battery during a long period of time, e.g., 4-8 hours before recharging, thicker electrodes over 1.0 millimeters are necessary to achieve this.

Although the possibility to manufacture thin electrodes is a major advantage when it comes to power applications, the invention should not be limited to "thin" electrodes. The invention is suggested to cover any type of electrodes having a PAM and/or NAM which include the process of pressing the active material into electrodes, irrespectively of the thickness of each electrode and—the presence of any additional material within the electrodes, such as conductive grids, metal coated fibers, etc.

The positive electrode has preferably lower capacity than the negative electrode due to the recombination process within a bipolar battery where the biplate assembly will be mounted.

The manufacturing process, as described above, may naturally perform the illustrated steps in a different order to obtain the same result. As an example, the step for treating the first limited area 13 in FIG. 1c may be followed by the step of treating the second limited area 16 in FIG. 1e, before the positive 15 and negative 18 electrodes are formed on the respective sides 11, 12 of the biplate 10.

Figure 2:
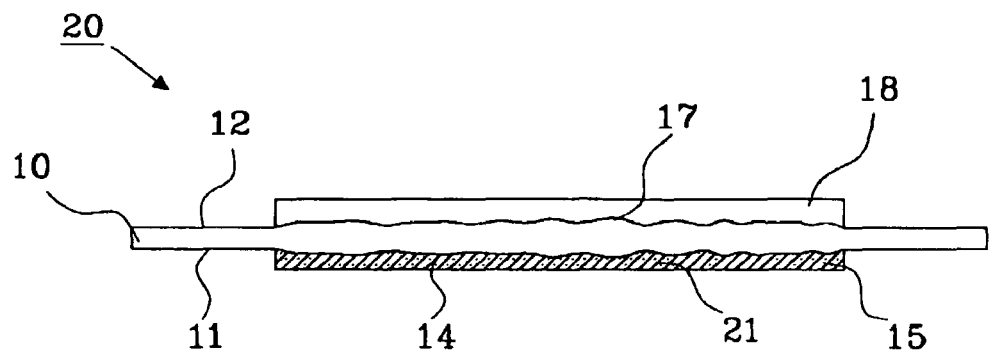
FIG. 2 shows a cross-sectional view of the biplate assembly along A-A' in FIG. 1g.

FIG. 2 shows a cross-sectional view of the biplate assembly along A-A' in FIG. 1g. The biplate assembly 20 comprises the biplate 10, the positive electrode 15 arranged on the first side 11 of the biplate 10 and the negative electrode 18 arranged on the second side 12 of the biplate 10.

The optional three-dimensional roughness 14, 17, respectively, are also shown in FIG. 2, where the increased surface area under each electrode is illustrated in an exaggerated way. The three-dimensional roughness may be established by using a technique called "flame spraying," where the surface of the biplate is treated with a material similar to the material of the biplate during a high temperature, e.g., 950-1050° C. Conventional flame spraying uses superheated gasses at high velocity, which produces overlapping layers of thin pancake type structures. The material of the biplate is preferably nickel or nickel plated steel and the biplate is preferably flame sprayed by using nickel fibers to create a three-dimensional surface. In the preferred embodiment, vertical and sloped fibers will be present which will deform when the powder is compacted, and will hold the compacted powder better during the manufacturing process. The technique for flame spraying is well known for a person skilled in the art and is not further elaborated in this disclosure.

The positive electrode 15 is in this embodiment also provided with nickel fibers 21 to increase the conductivity between the biplate 10 and the positive electrode 15. These nickel fibers 21 may be obtained from INCO (International Nickel Corporation), item 255 or 210.

By using a blend of active materials and conductive fibers, both for PAM and NAM, the materials may be assembled between the conductive biplates and held in position by assembly pressure. The PAM is typically a nickel hydroxide and the NAM is typically a metal hydride.

Figure 3:
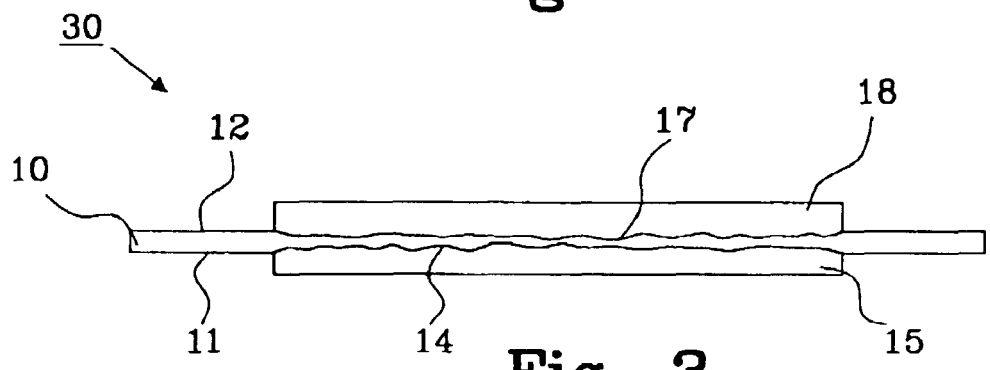
FIG. 3 shows a cross-sectional view of an alternative biplate assembly along A-A' in FIG. 1g.

FIG. 3 shows a cross-sectional view of an alternative biplate assembly along A-A' in FIG. 1g. The alternative biplate assembly 30 comprises the biplate 10, the positive electrode 15 arranged on the first side 11 of the biplate 10 and the negative electrode 18 arranged on the second side 12 of the biplate 10.

The optional three-dimensional roughness 14, 17, respectively, are also shown in FIG. 3, where the increased surface area under each electrode is illustrated in an exaggerated way. The three-dimensional roughness is in this alternative embodiment created by using an etching technique that remove material from the biplate 10. Several etching techniques may be used to obtain the three-dimensional roughness, such as wet etching and plasma etching. The etching technique is more difficult to implement in the manufacturing process due to the nature of etching and therefore the flame spraying technique is preferred over the etching technique.

The three-dimensional roughness 14, 17, respectively, in FIGS. 2 and 3 only is present under the formed electrodes, but it is of course possible to manufacture a biplate assembly where the electrodes only cover a part of the area having a three-dimensional roughness.

An alternative method for manufacturing a biplate assembly would be to first perform the steps described in connection with FIGS. 1a to 1d. The result of the manufacturing steps may be seen in FIG. 1d. Instead of turning the biplate up side down as illustrated in FIG. 1e, it is suggested to add a separator containing electrolyte, on top of the first electrode, and thereafter forming a second electrode on top of the separator. The step of selecting a second limited area and the optional step of creating a three-dimensional roughness as illustrated by FIG. 1f, may either be performed before the separator is added to the first electrode or after the second electrode has been formed.

In addition to the manufacturing method described in connection with FIGS. 1a-1g, it is also possible to produce a biplate assembly having separately manufactured electrodes.

Figure 7:
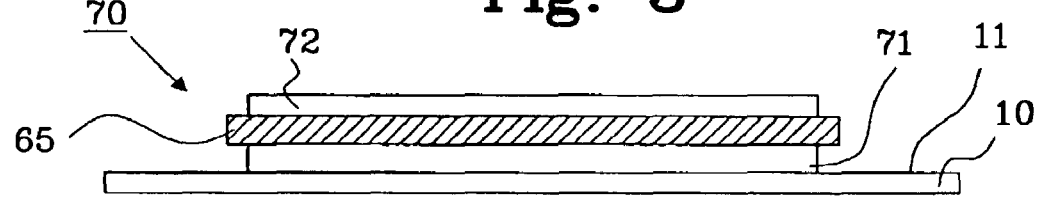
FIG. 7 shows a second biplate assembly according to the present invention.

FIG. 7 shows a second embodiment of a biplate assembly 70 manufactured using the alternative method as discussed in the paragraph above, but instead of pressing the powder directly to the biplate 10, the electrodes are manufactured separately.

The biplate assembly 70 comprises a biplate 10, a positive electrode 71 arranged to a first side 11 of the biplate 10, a separator 65 arranged on top of and covering the positive electrode 71, and a negative electrode 72 arranged to the separator 65. The thickness of the biplate 10 may be reduced compared to the thickness of the biplate used in connection with the manufacturing method described in FIGS. 1a-1g, since the biplate does not have to carry the electrodes during manufacture.

The manufacturing process of an electrode include forming an electrode by compressing a positive active material PAM or negative active material NAM, dependent on if a positive or a negative electrode is to be made, into a flat electrode material. This electrode material is very fragile, but may be handled using for instance vacuum tools.

It is possible to reduce the fragility by introducing a polymer mesh, preferably an extremely fine polymer mesh, to serve as a support means for the compressed powder. When the support means is present it is possible to manufacture a long continuous strip without generating any sharp edges that would cause shorts, as is the case with existing electrodes using metallic grids. The scrap generated could easily be ground, sifted and reused.

The use of the polymer mesh makes it possible to create an irregular shaped electrode without generating excessive scrap. The method of manufacture would include the following steps:

use the support mesh in place of the metallic grid support in the production of a continuous electrode strip,
  punch out the desired electrode shape, and
  grind and recycle the scrap.

The resulting electrode is thereafter arranged to the biplate 10 or the separator 65 as described above.

Figure 6:
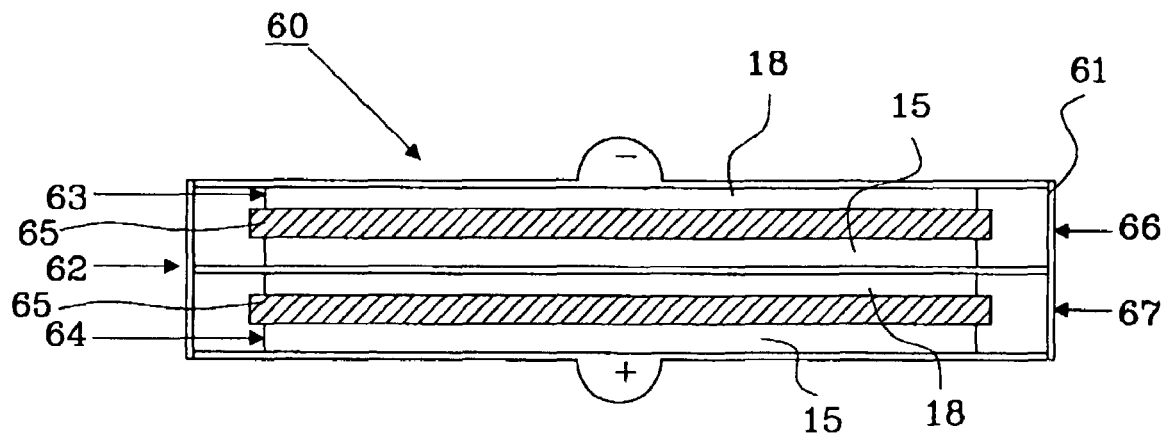
FIG. 6 shows a bipolar battery comprising biplate assemblies manufactured according to the present invention.

When a bipolar battery, as illustrated by FIG. 6, is taken apart after use it is very difficult to tell which type, of the two different kinds disclosed above, of biplate assembly has been used since the manufacturing principle behind the bipolar battery is to use pressure to hold every part together within the battery.

Figure 4:
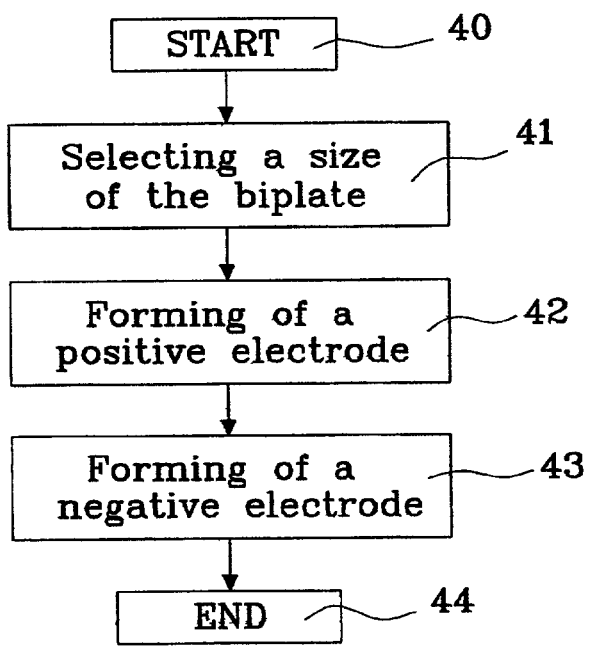
FIG. 4 shows a flow chart describing a first embodiment of the manufacturing process according to the invention.

FIG. 4 shows a flow chart describing the manufacturing process according to a first embodiment of the invention. The flow starts in step 40 and in step 41a size of the biplate has to be selected. This may be done in several way, e.g., each biplate may be cut out of a metal sheet having a predetermined having a predetermined thickness. Another way is to feed biplate material into the manufacturing process from a supply of biplate material. The size of each biplate is thereafter selected by cutting the biplate material in a desired length.

The flow proceeds to step 42 where the first electrode, e.g., the positive electrode, is formed by pressing a first type of powder onto a first side of the biplate. Then, in step 43, the second electrode, e.g., the negative electrode, is formed by pressing a second type of powder onto a second side, opposite to the first side, of the biplate. The flow ends in step 44.

A complete biplate assembly having a biplate, a positive electrode and a negative electrode has been created, where the electrodes have been formed directly onto the first and second side, respectively, thereby improving the characteristics of the biplate assembly.

An alternative flow, for manufacturing the alternative biplate assembly is to add a step between step 42 and 43, where a separator is added onto of the first electrode, and step 43 is performed in such a way to create a second electrode on top of the separator.

Figure 5:
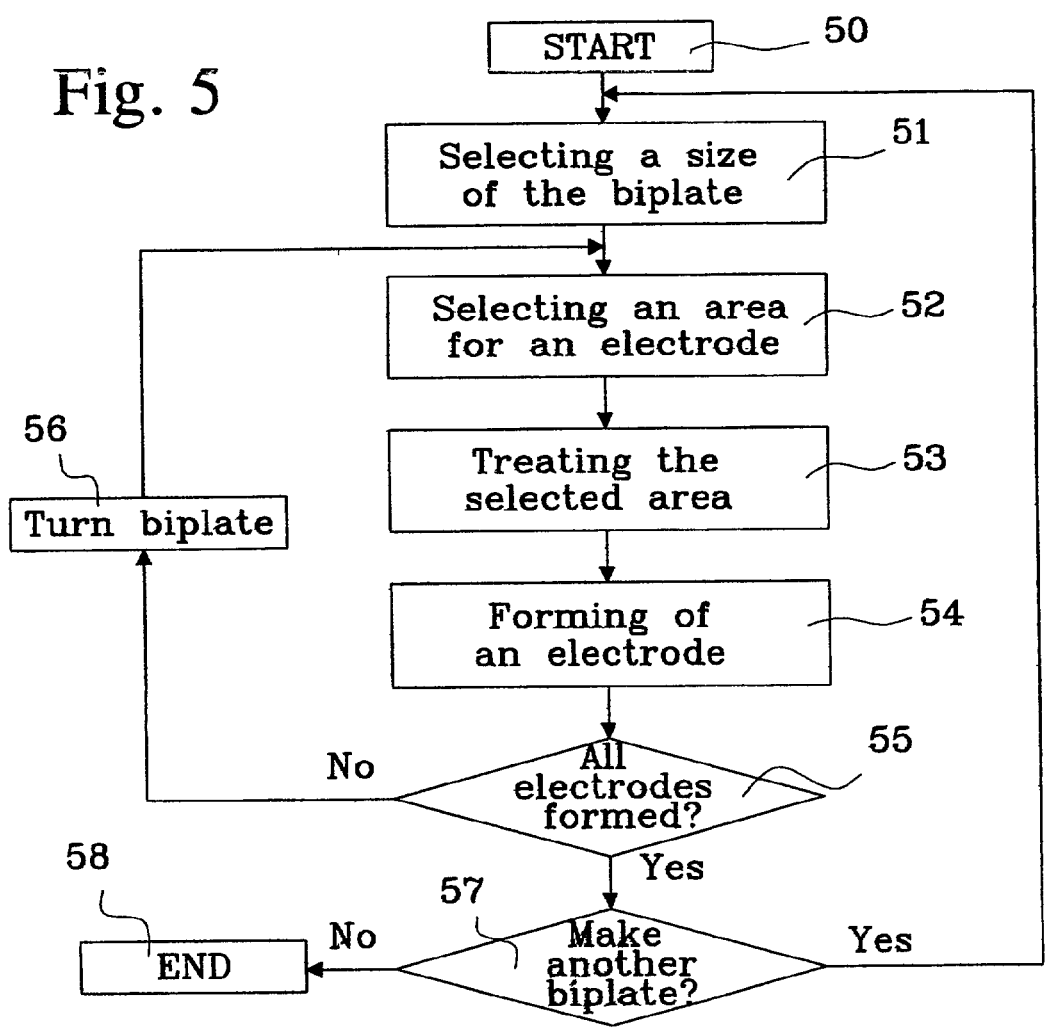
FIG. 5 shows a flow chart describing a second embodiment of the manufacturing process according to the invention.

FIG. 5 shows a flow chart describing a second embodiment of the manufacturing process according to the invention. The flow starts in step 50 and proceeds to step 51 where the size of the biplate is selected as described in connection with step 41 in FIG. 4. A limited area on a first side of the biplate is thereafter selected in step 52 where the positive electrode is to be formed.

Thereafter, the flow continues to the optional step 53, where a treatment of the first side, or at least the limited area selected in step 52, is performed. The object of the treatment is to obtain a three-dimensional roughness of at least the area where the positive electrode is to be formed.

In step 54 the positive electrode is formed by pressing powder, containing PAM, and, optionally, including metal fibers to enhance the conductivity between the positive electrode and the biplate.

In step 55, the manufacturing process determines if all electrodes have been formed on the biplate assembly. If not the flow returns to step 52 via a step 56, where the biplate is turned up side down so that the second side of the biplate face upwards. Step 52 through 54 is thereafter performed to form the negative electrode.

If all electrodes have been formed the flow continues to step 57, where the manufacturing process determine if another biplate assembly shall be manufactured. If another biplate shall be manufactured, the flow returns to step 51 and the process is repeated again. If not, the flow continues to step 58 where the process ends.

The alternative embodiment of the biplate assembly may also be illustrated by using a slightly modified FIG. 5.

The steps of the alternative method of manufacture, follows the description according to steps 51-55, with the additional feature that if not all electrodes have been formed on the biplate assembly the flow continues to a step where a separator is added on top of the first electrode and back to step 52. Steps 52 and 53 are performed in the same way as mentioned above, but step 54 is replaced by a step where the negative electrode is formed on top of the separator by pressing. The rest of the manufacturing steps are the same.

In some applications, such as power applications, it is beneficial to have as thin electrodes as possible. A preferred thickness for a power application is between 0.1 to 1.0 millimeter, which may be achieved by the proposed method of manufacture. In other applications, such as long time discharge, it is desired to have electrodes that have a thickness of more than 1.0 millimeter, which may be achieved by the proposed method of manufacture, but also of by combining known methods with the present method.

FIG. 6 shows a bipolar battery 60 including a housing 61, a biplate assembly 62, a negative end terminal 63, only having a negative electrode 18, and a positive end terminal 64 only having a positive electrode 15. A separator 65 is arranged between the negative end terminal 63 and the positive electrode 15 of the biplate assembly and another separator 65 is arranged between the negative electrode 18 of the biplate assembly and the positive end terminal 64.

The separator is porous and may hold a certain volume of electrolyte. Typically the separator is in a starved condition, resulting in gas passages that permit gas recombination. The principle of recombination batteries is not further elaborated in this description since it is common knowledge for a person skilled in the art.

The negative electrode 18 of the negative end terminal 63 together with the separator 65 and the positive electrode 15 of the biplate assembly 62 make up a first cell 66 within the bipolar battery 60. The negative electrode 18 of the bipolar assembly 62 together with the separator 65 and the positive electrode 15 of the positive end terminal 64 make up a second cell 67 within the bipolar battery 60.

The negative 63 and positive 64 end terminals may naturally be made from the same manufacturing process described above, with the exception that only one side of the biplate has a formed negative 18 or positive 15 electrode, respectively.

In the case the bipolar battery was made from the alternative biplate assembly, having a biplate with a positive electrode formed on one side, a separator added on top of the first electrode and a negative electrode formed on top of the separator, it would only comprise two biplate assemblies. The first biplate assembly being used as a positive end terminal and making up the second cell 67 in the battery except for the biplate provided by the second biplate assembly. The second biplate assembly makes up the first cell 66 in the battery except for the biplate being used as a negative end terminal. The negative end terminal only comprises a biplate with a three-dimensional roughness on the side where the electrode should make contact.

The invention claimed is:

1. A biplate assembly in a bipolar battery consisting of:
    a conductive biplate having a first side and a second side opposed to the first side;
    a first electrode consisting essentially of a first compressed powder arranged on the first side of the biplate, wherein the first compressed powder comprises a first active material comprising nickel hydroxide and powdered nickel fibers and is not subjected to sintering;
    a second electrode consisting essentially of a second compressed powder arranged on the second side of the biplate, wherein the second compressed powder comprises a second active material comprising an $AB_5$ metal hydride and powdered nickel fibers and is not subjected to sintering;
    wherein one of the first active material and the second active material is a positive chemically active material and the other of the first active material and the second active material is a negative chemically active material; and
    wherein the positive chemically active material and the negative chemically active material chemically react with at least one electrolyte.

2. The biplate assembly according to claim 1, wherein:
    the first electrode exhibits a substantially uniform composition in a direction normal to the first side of the biplate and in a direction parallel to the first side of the biplate; and
    the second electrode exhibits a substantially uniform composition in a direction normal to the second side of the biplate and in a direction parallel to the second side of the biplate.

3. The biplate assembly according to claim 1 wherein: the conductive biplate comprises nickel.

4. The biplate assembly according to claim 1, wherein: the conductive biplate consists essentially of nickel.

5. The biplate assembly according to claim 1, wherein: the conductive biplate consists essentially of nickel-plated steel.

6. The biplate assembly according to claim 3, wherein:
conductive material is removed from the first electrode area to provide increased surface roughness; and
conductive material is removed from the second electrode area to provide increased surface roughness.

7. The biplate assembly according to claim 3, wherein:
a first conductive material deposited on the first electrode area provides increased surface roughness in the first electrode area; and
a second conductive material deposited on the second electrode area provides increased surface roughness in the second electrode area.

8. The biplate assembly according to claim 3, wherein:
the powdered nickel fibers form a dendritic structure within the first electrode.

9. The biplate assembly according to claim 3, wherein:
the powdered nickel fibers form a dendritic structure within the second electrode.

10. A biplate assembly in a bipolar battery consisting of:
a conductive biplate having a first side and a second side opposed to the first side;
a first electrode consisting essentially of compressed powder formed on the first side of the biplate, wherein the compressed powder comprises a first active material and is not subjected to sintering;
a non-conductive porous carrier arranged on an upper surface of the first electrode;
a second electrode consisting essentially of compressed powder formed on an upper surface of the carrier, wherein the compressed powder comprises a second active material and is not subjected to sintering;
wherein one of the first active material and the second active material is a positive chemically active material and the other of the first active material and the second active material is a negative chemically active material; and
wherein the positive chemically active material and the negative chemically active material chemically react with at least one electrolyte.

11. A biplate assembly in a bipolar battery consisting of:
a conductive biplate having a first side and a second side opposed to the first side;
a first electrode consisting essentially of compressed powder and a non-conductive supporting mesh, wherein the compressed powder comprises a first active material, encapsulates the supporting mesh and is not subjected to sintering;
a second electrode consisting essentially of compressed powder and a non-conductive supporting mesh, wherein the compressed powder comprises a second active material, encapsulates the supporting mesh and is not subjected to sintering;
wherein one of the first active material and the second active material is a positive chemically active material and the other of the first active material and the second active material is a negative chemically active material; and
wherein the positive chemically active material and the negative chemically active material chemically react with at least one electrolyte.

12. A bipolar battery assembly comprising:
a first end plate assembly;
a second endplate assembly; and
a biplate assembly arranged between the first and second end plate assemblies, wherein the biplate assembly consists of a conductive biplate having a first side and a second side opposed to the first side;
a first electrode consisting essentially of compressed powder, wherein the compressed powder comprises a first active material comprising nickel hydroxide and powdered nickel fibers and is not subjected to sintering;
a second electrode consisting essentially of compressed powder, wherein the compressed powder comprises a second active material comprising an $AB_5$ metal hydride and powdered nickel fibers and is not subjected to sintering;
wherein one of the first active material and the second active material is a positive chemically active material and the other of the first active material and the second active material is a negative chemically active material; and
wherein the positive chemically active material and the negative chemically active material chemically react with at least one electrolyte to produce an electrical current flowing in a direction substantially normal to the first and second sides of the biplate.

* * * * *